United States Patent

Cheon et al.

(10) Patent No.: US 10,012,824 B2
(45) Date of Patent: Jul. 3, 2018

(54) OPTICAL DEVICE AND METHOD OF CONTROLLING DIRECTION OF LIGHT FROM OPTICAL DEVICE

(71) Applicant: SAMSUNG ELECTRONICS CO., LTD., Suwon-si (KR)

(72) Inventors: Sangmo Cheon, Bucheon-si (KR); Changwon Lee, Hwaseong-si (KR); Unjeong Kim, Hwaseong-si (KR); Jineun Kim, Suwon-si (KR); Younggeun Roh, Seoul (KR); Yeonsang Park, Seoul (KR); Chanwook Baik, Yongin-si (KR); Jaesoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/112,303

(22) PCT Filed: Jan. 13, 2015

(86) PCT No.: PCT/KR2015/000345
§ 371 (c)(1),
(2) Date: Jul. 18, 2016

(87) PCT Pub. No.: WO2015/108318
PCT Pub. Date: Jul. 23, 2015

(65) Prior Publication Data
US 2016/0341942 A1 Nov. 24, 2016

(30) Foreign Application Priority Data
Jan. 17, 2014 (KR) .......... 10-2014-0006267

(51) Int. Cl.
*G02F 1/29* (2006.01)
*G02B 26/08* (2006.01)
(Continued)

(52) U.S. Cl.
CPC .......... *G02B 17/004* (2013.01); *F21K 9/64* (2016.08); *G02B 5/008* (2013.01); *G02B 26/00* (2013.01)

(58) Field of Classification Search
CPC ...... G02B 17/004; G02B 5/008; G02B 26/00; F21K 9/64; B82Y 20/00
(Continued)

(56) References Cited

U.S. PATENT DOCUMENTS

| | | | |
|---|---|---|---|
| 7,933,720 B2 | 4/2011 | Park et al. | |
| 2008/0048193 A1* | 2/2008 | Yoo | H01L 25/0753 257/89 |

(Continued)

FOREIGN PATENT DOCUMENTS

| | | |
|---|---|---|
| JP | 2010-146638 A | 7/2010 |
| JP | 2011-014857 A | 1/2011 |

(Continued)

OTHER PUBLICATIONS

Stéphane Collin, et al., "Waveguiding in nanoscale metallic apertures", Optics Express, vol. 15, No. 7, Apr. 2, 2007, pp. 4310-4320.
International Search Report dated Apr. 10, 2015 issued by the International Searching Authority in International Application No. PCT/KR2015/000345 [PCT/ISA/210].

*Primary Examiner* — Tuyen Tra
(74) *Attorney, Agent, or Firm* — Sughrue Mion, PLLC (57) ABSTRACT

Provided are an optical device and a method of controlling the direction of light from an optical device. The optical device includes: a substrate; a metal layer on the substrate; a first slot which is provided in the metal layer; and at least one light source provided in the first slot, wherein light is emitted from the at least one light source in the direction of the top part of the first slot or the bottom part of the first slot.

18 Claims, 5 Drawing Sheets

(51) Int. Cl.
*G02B 17/00* (2006.01)
*G02B 26/00* (2006.01)
*F21K 9/64* (2016.01)
*G02B 5/00* (2006.01)

(58) Field of Classification Search
USPC ............... 359/244, 241, 240, 238, 237, 298
See application file for complete search history.

(56) References Cited

U.S. PATENT DOCUMENTS

| | | |
|---|---|---|
| 2009/0156427 A1 | 6/2009 | Zhang et al. |
| 2009/0188544 A1* | 7/2009 | Kobayashi ............. B82Y 20/00 |
| | | 136/244 |
| 2012/0006981 A1 | 1/2012 | Von Dorpe et al. |
| 2012/0056776 A1 | 3/2012 | Shijo et al. |
| 2012/0021932 A1 | 6/2012 | Mershin et al. |
| 2013/0070459 A1 | 3/2013 | Kim et al. |
| 2013/0317421 A1 | 11/2013 | Choi et al. |
| 2014/0376073 A1 | 12/2014 | Kim et al. |
| 2016/0170237 A1 | 6/2016 | Han et al. |

FOREIGN PATENT DOCUMENTS

| | | |
|---|---|---|
| KR | 10-2012-0077417 A | 7/2012 |
| KR | 10-2012-0088462 A | 8/2012 |
| KR | 10-2014-0147383 A | 12/2014 |

\* cited by examiner

OPTICAL DEVICE AND METHOD OF CONTROLLING DIRECTION OF LIGHT FROM OPTICAL DEVICE

TECHNICAL FIELD

The present disclosure relates to an optical device and a method of controlling the direction of light from the optical device.

BACKGROUND ART

Recently, many optical devices using light have been developed. As the optical devices use light, they have an advantage of fast processing speeds. However, while the size of electrical devices decreases down to tens to hundreds of nanometers, there is a limit to reducing the size of the optical devices because it is difficult to make an optical device with a size that is equal to or less than a wavelength because of the diffraction limit characteristic of light.

DISCLOSURE OF INVENTION

Technical Problem

Accordingly, there is a limit to making an integrated optical circuit using optical devices.

Solution to Problem

Provided is a nano-size optical device.

Provided is a method of controlling the direction of light from a nano-size optical device.

Additional aspects will be set forth in part in the description which follows and, in part, will be apparent from the description, or may be learned by practice of the present embodiments.

According to an aspect of the present embodiments, an optical device includes: a substrate; a metal layer on the substrate; a first slot which is provided in the metal layer; and at least one light source provided in the first slot, wherein light is emitted from the at least one light source in the direction of the top part of the first slot or the bottom part of the first slot.

The first slot may have a hexahedron shape having a thickness, length and width and by changing at least one of the thickness, length and width, the resonance wavelength of light from the at least one light sources may be adjusted.

The light emitting direction of light from the at least one light sources may be adjusted by changing at least one of the thickness, length and width of the first slot.

The first slot may have a hexahedron shape having a thickness with a range of 100 to 500 nm, a length with a range of 100 to 500 nm, and a width with a range of 10 to 80 nm.

The light source may include a quantum dot, a dye molecule, or a fluorescent material.

Surface plasmons may be generated on the metal layer.

The substrate may be formed with a transparent dielectric material.

The substrate may be formed of glass.

The optical device may further include at least second slot which is formed separate from the first slot.

The second slot may be formed to be in parallel to the first slot or to slope with respect to the first slot.

The at least one light source may include a first light source and a second light source, and the first light source and the second light source may emit respective lights of which wavelengths differ.

The light from any one of the first and second light sources may be emitted in the direction of the top part, and the light from the other may be emitted in the direction of the bottom part.

According to another aspect of the present invention, a method of controlling the direction of light from an optical device, includes: forming a nano-size slot in a metal layer on a substrate; providing at least one light source in the slot; and by adjusting the size of the nano-size slot, emitting light from the at least one light source in the direction of the top part of the first slot or in the direction of the bottom part of the slot.

Advantageous Effects of Invention

An optical device according to an exemplary embodiment of the present invention may have at least one light source and may adjust the traveling direction of the light from the at least one light source. Accordingly, an embodiment of the present invention enables implementation of a nano-size optical device and by using this optical device, an integrated optical circuit may be manufactured.

BRIEF DESCRIPTION OF DRAWINGS

These and/or other aspects will become apparent and more readily appreciated from the following description of the embodiments, taken in conjunction with the accompanying drawings in which.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as at least one of, when preceding a list of elements, modify the entire list of elements and do not modify the individual elements of the list.

Figure 1:
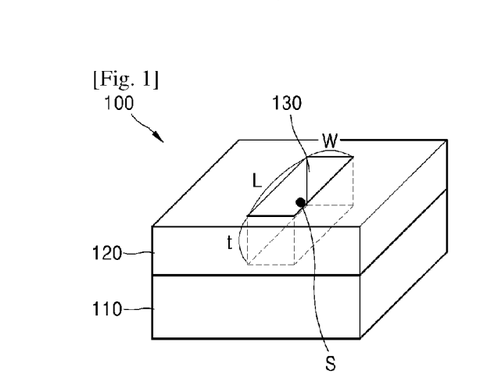
FIG. 1 is a schematic diagram of an optical device according to exemplary embodiment of the present invention.

FIG. 1 is a schematic diagram of an optical device 100 according to exemplary embodiment of the present invention. The optical device 100 includes a substrate 110, a metal layer 120 on the substrate 110, and at least one slot 130 provided in the metal layer 120.

The substrate 110 may include a dielectric material. The substrate 110 may be formed of, for example, $Al_2O_3$ or $SiO_2$. The metal layer 120 may be formed of at least one selected from the group consisting of, for example, Ti, Au, Ag, Pt, Cu, Al, Ni, and Cr.

The slot 130 may have a nanometer size. The slot 130 may have, for example, a hexahedron shape with a thickness h, a width W, and a length L.

In the slot 130, at least one light source S may be provided. The light source S may include at least one of a point light source, a line light source, and a surface light source. The light source S may include at least one of, for example, a quantum dot, a dye molecule, and a fluorescent material. The light source S may include a light source which emits light by itself or a light source which is excited by light from the outside. For example, if a laser beam is emitted to a quantum dot, the quantum dot may emit light when the quantum dot returns to an original state thereof after an excited state thereof. The slot 130, in which the light source S is placed, may operate as a feeder of the optical device 100.

By adjusting the size of the slot 130, light from the light source S may be resonated, and the resonance wavelength of the light may be adjusted. For example, by changing at least one of the thickness, width, and length of the slot 130, the resonant wavelength of light may be adjusted.

The metal layer 120 may generate surface plasmons on its surface by light emitted from the outside. Then, the surface plasmons generated on the metal layer 120 may be converted into light through coupling with the slot 130. The optical device 100 according to an exemplary embodiment of the present invention may transmit light from the light source S and transmit the surface plasmons generated in the metal layer 120. Like this, the optical device 100 according to an exemplary embodiment of the present invention may operate as, for example, a nano antenna.

Figure 2A:
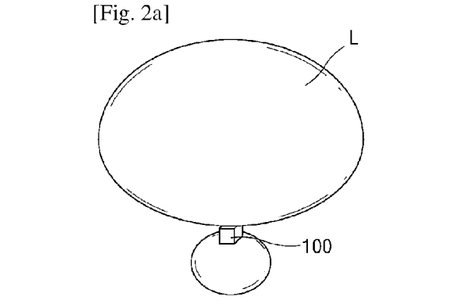
FIG. 2A is a diagram illustrating that light from an optical device according to an exemplary embodiment of the present invention is emitted in the direction of the top part of the optical device.
Figure 2B:
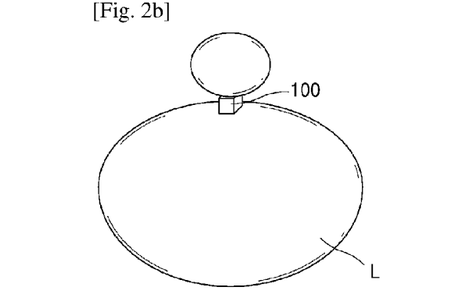
FIG. 2B is a diagram illustrating that light from an optical device according to an exemplary embodiment of the present invention is emitted in the direction of the bottom part of the optical device.

FIGS. 2A and 2B are schematic diagrams of profiles of light L from the light source S after being resonated and emitted.

FIG. 2A shows that the light L is emitted in the direction of the top part of the optical device 100 and FIG. 2B shows that the light L is emitted in the direction of the bottom part of the optical device 100.

In one slot, two resonance wavelengths can exist. Between the two resonance wavelengths, the light having the shorter wavelength may be emitted in the direction of the bottom part of the slot, and the light having the longer wavelength may be emitted in the direction of the top part of the slot. Hereinafter, emission in the direction of the top part of the slot will be referred to as A mode and emission in the direction of the bottom part of the slot will be referred to as G mode.

For example, light in A mode may resonate on the boundary surface between the air and the metal layer 120 and light in G mode may resonate on the boundary surface between the metal layer 120 and the substrate 110.

The direction of light emission and resonance wavelength may be adjusted by changing at least one of the thickness t, width W, and length L of the slot 130.

Figure 3:
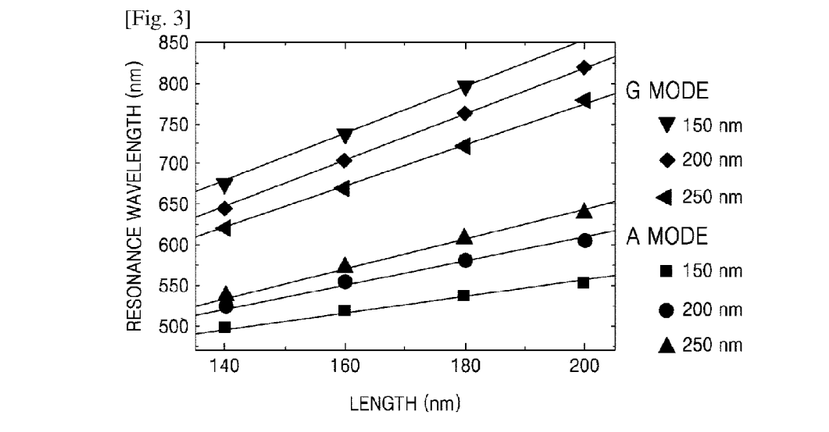
FIG. 3 is a graph showing changes in the resonance wavelength according to the length of a slot of an optical device according to an exemplary embodiment of the present invention with respect to the thickness of the slot.

FIG. 3 is a graph showing changes in the resonance wavelength according to the length L of the slot 130.

The resonance wavelengths of A mode and G mode may be increased according to the length L of the slot 130.

Also, according to the simulation result of this change with respect to a thickness th of the slot 130, if the thickness t of the slot 130 increases, the resonance wavelength decreases in G mode. If the thickness t of the slot 130 increases, the resonance wavelength increases in A mode.

Figure 4:
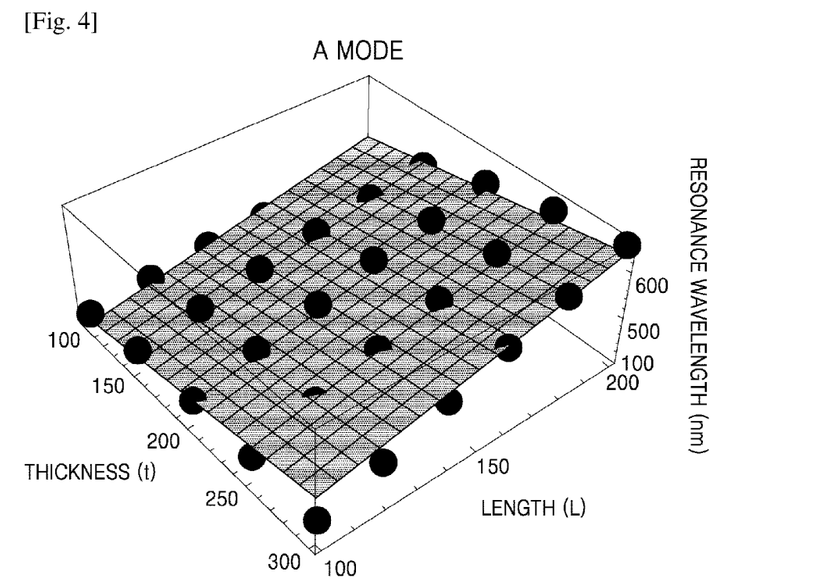
FIG. 4 is a diagram showing changes in the resonance wavelength in A mode occurring on a glass-slot boundary surface of an optical device according to an exemplary embodiment of the present invention with respect to the length and thickness of the slot of the optical device.
Figure 5:
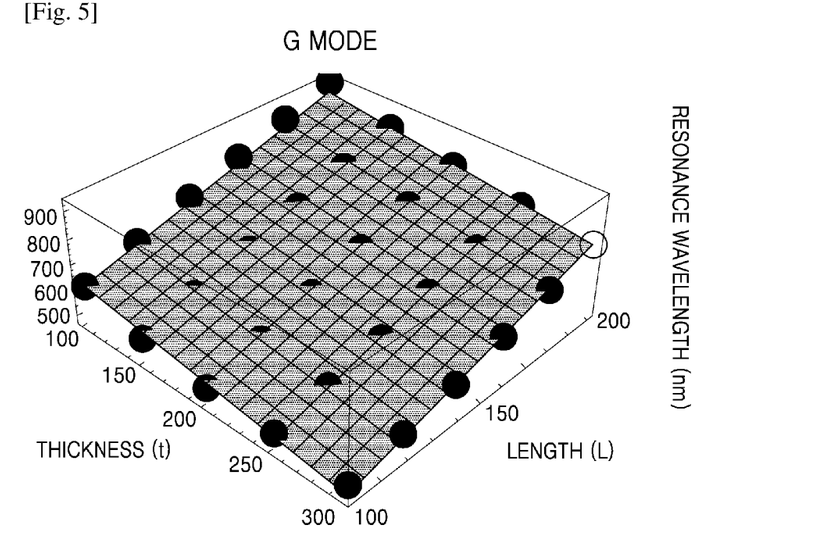
FIG. 5 is a diagram showing changes in the resonance wavelength in G mode occurring on an air-slot boundary surface of an optical device according to an exemplary embodiment of the present invention with respect to the length and thickness of the slot of the optical device.

FIG. 4 is a diagram showing a simulation result of the relationship between a slot structure and a resonance wavelength in A mode. FIG. 5 is a diagram showing a simulation result of the relationship between a slot structure and a resonance wavelength in G mode.

Figure 6:
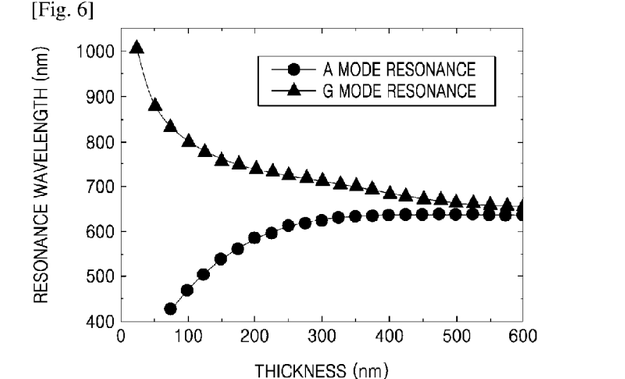
FIG. 6 is a graph showing changes in the resonance wavelength in A mode and G mode of an optical device according to an exemplary embodiment of the present invention with respect to the thickness of a slot of the optical device.

FIG. 6 shows changes in the resonance wavelength of light with respect to the thickness h of the slot, for example, when the length of the slot is 180 nm and the width is 50 nm. For example, when the thickness is approximately 200 nm, a first resonance wavelength of approximately 550 nm and a second resonance wavelength of approximately 750 nm may be obtained. Also, when the thickness is approximately 300 nm, a first resonance wavelength of approximately 650 nm and a second resonance wavelength of approximately 730 nm may be obtained.

Like this, by adjusting at least one of the thickness, length, and width of a slot, the resonance wavelength may be adjusted. Also, one slot has at least two resonance wavelengths.

In a nano-scale slot made of a metal, the resonance wavelength may be determined by a plasmonic effect. That is, the resonance wavelength may be determined by the skin depth and a material impedance matching condition. Accordingly, the resonance wavelength of a slot approximately tends to have the following characteristics:

(1) The resonance wavelength is proportional to the length L. The proportional constant may be determined by the refractive index of a metal and surrounding dielectric materials (for example, air or glass).

(2) The resonance wavelength is proportional or inverse proportional to the thickness t. In A mode, when the thickness t increases, the resonance wavelength increases, and in G mode, when the thickness t increases, the resonance wavelength decreases.

(3) If the width W decreases, the resonance frequency increases (red-shift phenomenon).

Accordingly, in a slot, the resonance wavelength may be approximately determined by the following Equation 1:

$$\lambda = a + b \times L + c \times t + d \times W \quad (1)$$

For example, when the metal is silver, the result of a simulation to make a resonance wavelength be in the range of 400 to 700 nm is as follows:

A first wavelength band (1) of A mode in which light is emitted in the direction of the top part of the slot is as the following Equation 2:

$$\lambda_1 = 410 + 2.8L - 0.7t - 1.7 \times W \quad (2)$$

A second wavelength band (2) of G mode in which light is emitted in the direction of the bottom part of the slot is as the following Equation 3:

$$\lambda_2 = 210 + 1.4L + 0.5t - 1.5 \times W \quad (3)$$

According to the design of the slot, if light matches (1), the light may be emitted in the direction of the top part of the slot, and if light matches (2), the light may be emitted in the direction of the bottom part of the slot. Referring to FIG. 6, with the increasing thickness of the slot, the difference between the first and second resonance wavelengths decreases. The smaller the difference between the first and second resonance wavelengths, the more the spectroscopic capability (or resolving power) may be decreased. In order to obtain a predetermined spectroscopic capability, for example, the slot has a thickness in a range of 100 to 500 nm. Also, the slot may have a length in a range of 100 to 50 nm and a width in a range of 10 to 80 nm. In order to obtain a predetermined spectroscopic capability, the difference between the first and second resonance wavelengths may be adjusted. According to Equations 2 and 3, the difference between the first and second resonance wavelengths is obtained by the following Equation 4:

$$\Delta\lambda = 200 + 1.4L - 0.2t - 0.2W \quad (4)$$

For example, in order to use a nano antenna in a visible light region, the difference between the first and second resonance wavelengths may have a range of 400 to 2000 nm.

In order to make the difference between the first and second resonance wavelengths be in a range of 400 to 2000 nm, for example, the slot may have a thickness in a range of 100 to 500 nm.

Figure 7:
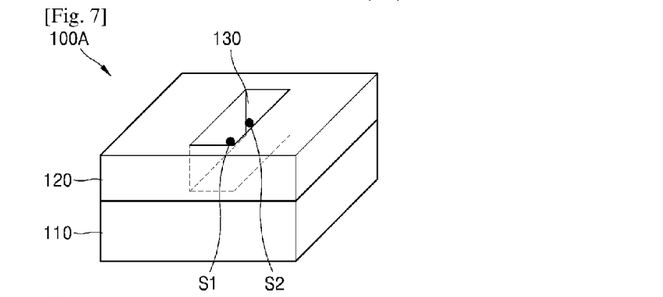
FIG. 7 shows a modification example of the optical device shown in FIG. 1.

FIG. 7 shows an example of an optical device 100A in which at least one light source includes a first light source S1 and a second light source S2. The first light source S1 and the second light source S2 may be provided in the center of the slot 130. The first light source S1 and the second light source S2 may emit lights having different wavelengths. For example, the first light source S1 may emit light with a blue wavelength and the second light source S2 may emit light with a red wavelength. Also, the first light source S1 may emit light with a blue wavelength and the second light source S2 may emit light with a green wavelength. However, this is just an example and does not limit the scope of the present invention. The first light source S1 and the second light source S2 may include at least one of, for example, a quantum dot, a dye molecule, and a fluorescent material.

Figure 8:
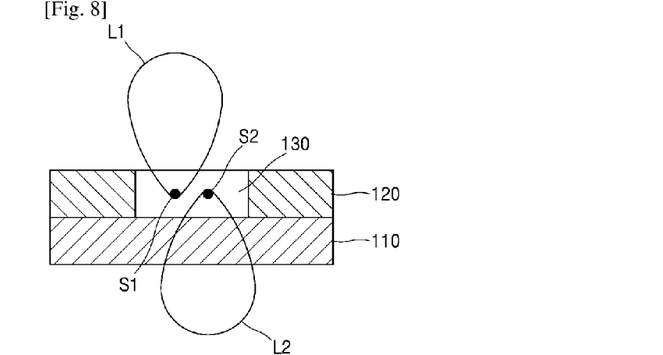
FIG. 8 is a schematic diagram illustrating the direction of light emission from the optical device shown in FIG. 7.

Referring to FIG. 8, a first light L1 from the first light source S1 may be emitted in the direction of the top part of the slot 130, and a second light L2 from the second light source S2 may be emitted in the direction of the bottom part of the slot 130. For example, if a laser is emitted to the first light source S1 and the second light source S2, the first light source S1 and the second light source S2 may be excited and, when returning to the original states thereof, may emit lights. Here, the first light L1 from the first light source S1 and the second light L2 from the second light source S2 may be made to be emitted in different directions. By doing so, the optical device 100A may resolve the two lights having different wavelengths and make the two lights travel in different paths.

The optical device 100A may have, for example, two resonance wavelengths.

The lights from the first light source S1 and the second light source S2 may have wavelengths in the range of 350 nm to 2 m.

If the resonance wavelength is determined according to the size of the slot 130, a light source emitting a light with a wavelength corresponding to the resonance wavelength may be inserted into the slot 130. As the light from a light source resonates, an optical signal may be amplified.

As described above, when at least one light source is provided in a slot, light from the light source may be amplified and emitted in a first direction, for example, in the direction of the top part of the slot, or in a second direction, for example, in the direction of the bottom part of the slot.

By using this operation, when there are two light sources, an optical device may perform a function of resolving light with two different wavelengths.

Figure 9:
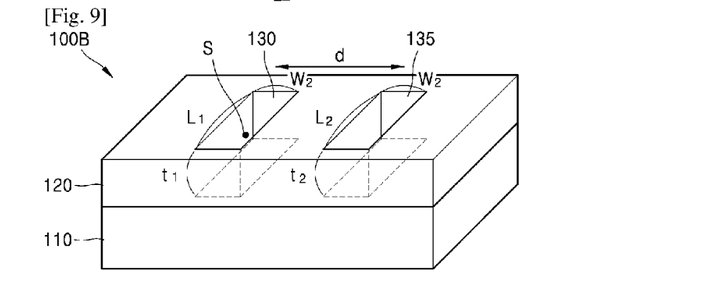
FIG. 9 shows another modification example of the optical device shown in FIG. 1.

FIG. 9 shows an optical device 100B according to another exemplary embodiment of the present invention. The optical device 100B has a metal layer 120 on a substrate 110 and a first slot 130 and a second slot 135 in the metal layer 120. Compared to FIG. 1, the difference is that the optical device 100B has a plurality of slots. Here, though an example of two slots is shown, the number of slots may be three or more. Also, some of the plurality of slots may be provided on one side of the first slot 130 and the other slots may be provided on the other side of the first slot 130. At least one light source S may be provided in the first slot 130. The first slot 130 may have a size capable of resonating light from the light source S.

The first slot 130 may have a hexahedron shape having a first thickness $t_1$, a first width $W_1$, and a first length $L_1$. The second slot 135 may have a hexahedron shape having a second thickness $t_2$, a second width $W_2$, and a second length $L_2$. The distance between the first slot 130 and the second slot 135 will be referred to as d.

For example, by changing at least one of the first thickness $t_1$, the first width $W_1$, the first length $L_1$, the second thickness $t_2$, the second width $W_2$, the second length $L_2$, and the distance d between the first slot 130 and the second slot 135, the traveling direction of the light from the light source S may be adjusted.

Figure 10:
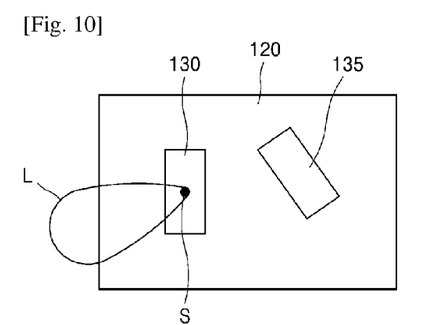
FIG. 10 shows an example in which the location of a slot of the optical device shown in FIG. 9 is changed.

The first slot 130 and the second slot 135 may be arranged, for example, in parallel. Also, as shown in FIG. 10, the first slot 130 and the second slot 135 may not be arranged in parallel. For example, the second slot 135 may be arranged to slope with respect to the first slot 130. Also, as shown in FIG. 9, the relative location of the second slot 135 to the first slot 130 may be changed.

Figure 11:
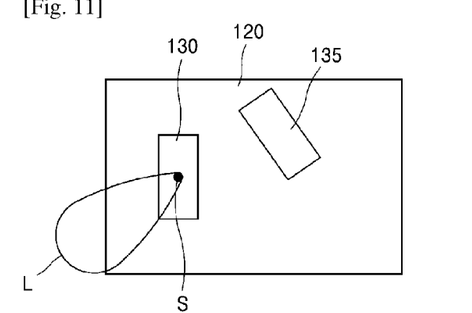
FIG. 11 shows an example in which the location of a slot of the optical device shown in FIG. 9 is changed.

The second slot 135 may f a reflector which changes the traveling direction of the light from the light source S, by reflecting the light. That is, according to the position of the second slot 135, the traveling direction of the light may change. Also, according to the position of the second slot 135, the frequency of reflection of the light from the light source S, or the reflected amount of light may change. For example, in the structure shown in FIG. 11 compared to the structure shown in FIG. 10, the frequency of reflection of the light between the first slot 130 and the second slot 135 may be greater, and with the increased reflection frequency, the amount of light may increase.

The operation of the optical device 100B will now be explained.

For example, if a laser is emitted to the light source S, light L from the light source S may be emitted. According to the structure and size of the first slot 130, the light from the light source S may be emitted in a first direction, for example, in the direction of the top part of the first slot 130, or in a second direction, for example, in the direction of the bottom part of the first slot 130. The light from the light source S may be resonated and amplified. The traveling direction of the light may be changed by interaction with the second slot 135. For example, if the light L from the light source S is emitted in the direction of the top part of the first slot 130, the light L may travel in the direction of the top left of FIG. 9 by the second slot 135. Also, if the light L from the light source S is emitted in the direction of the bottom part of the first slot 130, the light L may travel in the direction of the bottom left of FIG. 9 by the second slot 135.

Also, as shown in FIG. 10, if the second slot 135 slopes with respect to the first slot 130, the reflection direction of the light L from the light source S may be changed into the direction of the bottom part of the first slot 130 by the second slot 135.

The metal layer 120 may generate surface plasmons on the surface thereof by light incident from the outside. Then, the surface plasmons cause coupling with the first slot 130 and the second slot 135, and part of the surface plasmons may be converted into light. Then, by interaction with the second slot 135, the traveling direction of the surface plasmons may be controlled. Accordingly, the optical device according to an embodiment of the present invention may transmit the light from the light source S and transmit the surface plasmons generated on the metal layer 120.

Figure 12:
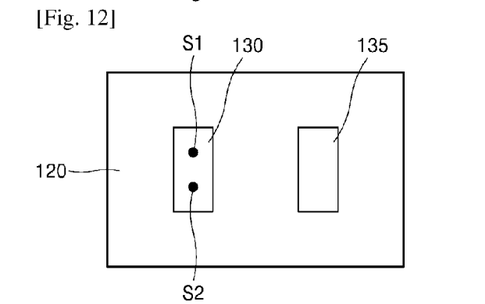
FIG. 12 shows an example in which the number of light sources in the optical device shown in FIG. 9 is changed.

Next, FIG. 12 shows an example in which the first slot 130 has a first light source S1 and a second light source S2.

For example, a first light from the first light source S1 may be emitted in the direction of the top part of the first slot 130 and a second light from the second light source S2 may be emitted in the direction of the bottom part of the first slot 130. The first light may travel in the direction of the left top part of the first slot 130 by interaction with the second slot 135 and the second light may travel in the direction of the left bottom part of the first slot 130 by interaction with the second slot 135. Like this, in one optical device, the traveling directions of two lights with different wavelengths may be controlled. By using this optical device, light can be transmitted and received.

Figure 13:
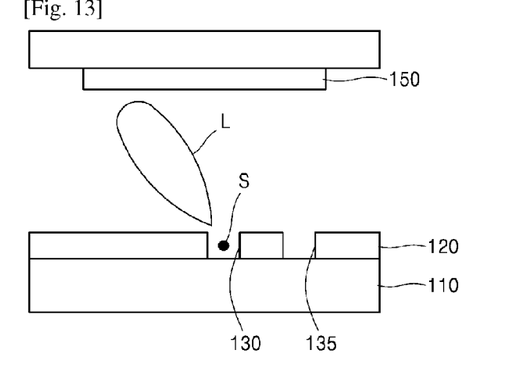
FIGS. 13 and 14 show examples in which optical devices according to exemplary embodiments of the present invention are applied to photodetectors.

FIG. 13 shows an example in which an optical device having, for example, one light source S is applied to a photodetector. Light L from the light source S may be emitted in the direction of the top part of the first slot 130 and by the second slot 135, light may be transmitted in the direction of the left top part of the first slot 130. The light L may be detected by a sensor 150. The sensor 150 may be applied to, for example, a biosensor. The sensor 150 may be a complementary metal oxide semiconductor (CMOS) sensor. Also, if the sensor 150 is below the substrate 110, light from the light source S may be made to be emitted in the direction of the bottom part of the first slot 130, and thus, to be transmitted.

Figure 14:
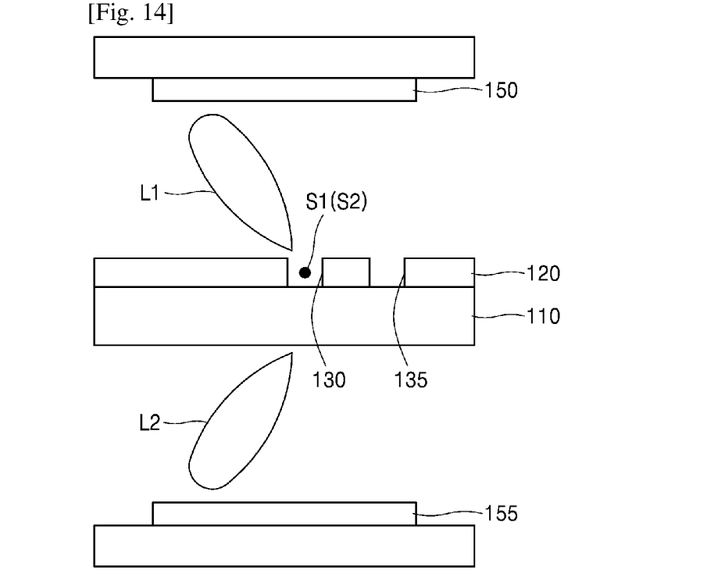

FIG. 14 shows an example in which an optical device having a first light source S1 and a second light source S2 is applied to a photodetector.

A first sensor 150 and a second sensor 155 are provided, and, for example, the first sensor 150 may be provided on the top side of the optical device and the second sensor 155 may be provided on the bottom side of the optical device. A first light L1 from the first light source S1 may be controlled to be emitted in the direction of the top part of the first slot 130, and a second light L2 from the second light source S2 may be controlled to be emitted in the direction of the bottom part of the first slot 130. The first light L1 may travel in the direction of the left top part of the first slot 130 by the second slot 135 and may be transmitted to the first sensor 150. The second light L2 may travel in the direction of the left bottom part of the first slot 130 by the second slot 135 and may be transmitted to the second sensor 155. As shown in FIG. 14, by using the optical device according to an embodiment of the present invention, bidirectional light transmission is possible. Also, the optical device according to an embodiment of the present invention may be applied to a nano antenna.

Figure 15:
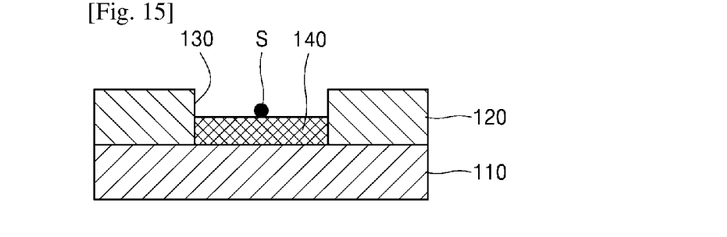
FIG. 15 shows another modification example of the optical device shown in FIG. 1.

FIG. 15 shows an example in which the optical device 100 shown in FIG. 1 additionally has a support layer 140 at the bottom of the slot 130 and the light source S is placed at the center of the slot 130. According to the height of the support layer 140, the position of the light source S may be adjusted. The light source S may be placed approximately at the center of the slot 130.

As described above, the optical device according to an exemplary embodiment of the present invention may have at least one light source and may adjust the traveling direction of the light from the at least one light source. Accordingly, an embodiment of the present invention enables implementation of a nano-size optical device and by using this optical device, an integrated optical circuit may be manufactured.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An optical device comprising:
    a substrate;
    a metal layer on the substrate;
    a first nano-size slot which is provided in the metal layer; and
    at least one light source provided in the first nano-size slot, wherein light is emitted from the at least one light source in a direction of a top part of the first nano-size slot or a bottom part of the first nano-size slot, and
    wherein the at least one light source comprises a first light source and a second light source, and the first light source and the second light source emit respective lights of which wavelengths differ.

2. The optical device of claim 1, wherein the first slot has a hexahedron shape having a thickness, length, and width and by changing at least one of the thickness, length, and width, a resonance wavelength of light from the at least one light source is adjusted.

3. The optical device of claim 2, wherein the light emitting direction of light from the at least one light source is adjusted by changing at least one of the thickness, length, and width of the first slot.

4. The optical device of claim 1, wherein the first slot has a hexahedron shape having a thickness with a range of 100 to 500 nm, a length with a range of 100 to 500 nm, and a width with a range of 10 to 80 nm.

5. The optical device of claim 1, wherein the light source comprises a quantum dot, a dye molecule, or a fluorescent material.

6. The optical device of claim 1, wherein surface plasmons are generated on the metal layer.

7. The optical device of claim 1, wherein the substrate is formed of a transparent dielectric material.

8. The optical device of claim 7, wherein the substrate is formed of glass.

9. The optical device of claim 1, further comprising at least one second slot which is formed separate from the first slot.

10. The optical device of claim 9, wherein the second slot is formed to be in parallel to the first slot or to slope with respect to the first slot.

11. The optical device of claim 1, wherein light from any one of the first and second light sources is emitted in the direction of the top part of the first slot, and light from another one of the first and second light sources is emitted in the direction of the bottom part of the first slot.

12. A method of controlling a direction of light from an optical device, the method comprising:

forming a nano-size slot in a metal layer on a substrate; providing at least one light source in the slot; and by adjusting a size of the nano-size slot, emitting light from the at least one light source in a direction of a top part of the first slot or in a direction of a bottom part of the slot, wherein the at least one light source comprises a first light source and a second light source, and the first light source and the second light source emit respective lights of which wavelengths differ.

13. The method of claim 12, wherein the slot has a hexahedron shape having a thickness, length, and width and by changing at least one of the thickness, length, and width, a resonance wavelength of light from the at least one of light source is adjusted.

14. The method of claim 13, wherein light emitting direction of light from the at least one light source is adjusted by changing at least one of the thickness, length, and width of the nano-size slot.

15. The method of claim 12, wherein the nano-size slot has a hexahedron shape having a thickness with a range of 100 to 500 nm, a length with a range of 100 to 500 nm, and a width with a range of 10 to 80 nm.

16. The method of claim 12, wherein light source comprises a quantum dot, a dye molecule, or a fluorescent material.

17. The method of claim 12, wherein surface plasmons are generated on the metal layer.

18. The method of claim 12, wherein the substrate is formed of a transparent dielectric material.

* * * * *